US008914011B2

(12) United States Patent
Cheuk et al.

(10) Patent No.: US 8,914,011 B2
(45) Date of Patent: Dec. 16, 2014

(54) SELF-ACTIVATION THROUGH A NON-ACTIVATED DEVICE

(75) Inventors: Ho Yin Cheuk, Bridgewater, NJ (US); Lixia Yan, Bedminster, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 29 days.

(21) Appl. No.: 13/569,060

(22) Filed: Aug. 7, 2012

(65) Prior Publication Data

US 2014/0045474 A1 Feb. 13, 2014

(51) Int. Cl.
*H04M 3/00* (2006.01)
*H04W 8/18* (2009.01)
*H04W 12/06* (2009.01)

(52) U.S. Cl.
CPC .............. *H04W 8/18* (2013.01); *H04W 12/06* (2013.01)
USPC ............ 455/418; 455/410; 455/411; 455/420

(58) Field of Classification Search
CPC ....... H04W 8/18; H04W 12/00; H04W 12/06; H04W 12/08; H04W 12/11; H04W 28/18
USPC .......... 455/403, 414.1, 418, 419, 420, 435.1, 455/558, 410, 411; 726/2, 3, 4, 5; 380/247, 380/248, 249; 235/472.01, 472.02, 375, 235/487, 492
See application file for complete search history.

(56) References Cited

U.S. PATENT DOCUMENTS

| 5,946,613 | A | * | 8/1999 | Hayes et al. | ........... 455/406 |
| 2001/0039589 | A1 | * | 11/2001 | Aho et al. | ............. 709/230 |
| 2008/0064367 | A1 | * | 3/2008 | Nath et al. | ........... 455/411 |
| 2010/0121736 | A1 | * | 5/2010 | Kalke | ................. 705/27 |
| 2011/0159843 | A1 | * | 6/2011 | Heath et al. | ......... 455/411 |
| 2012/0157047 | A1 | * | 6/2012 | Chen et al. | ......... 455/411 |

* cited by examiner

*Primary Examiner* — Jean Gelin

(57) ABSTRACT

A method of permitting self-activation of a mobile device is presented. The device is able to be activated without accessing the Internet or relying on a customer service representative when a device with a SIM card is initially powered on. A device client resident on the mobile device detects that the SIM card is self-activation capable, and then provides a customized interface to walk the user through a self-activation process. The interface provides various features associated with the communication functionality of the device, whether or not the functionality is dependent on the make and model of the mobile device.

20 Claims, 5 Drawing Sheets

FIG. 3

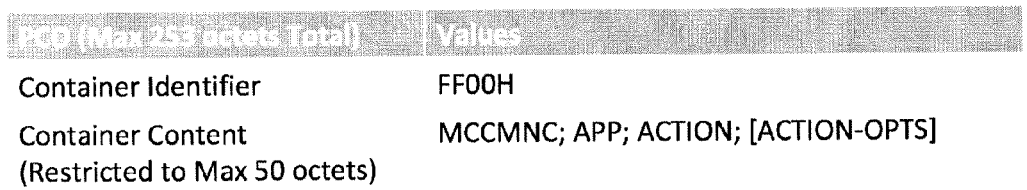

| PCD (Max 253 octets Total) | Values |
|---|---|
| Container Identifier | FF00H |
| Container Content (Restricted to Max 50 octets) | MCCMNC; APP; ACTION; [ACTION-OPTS] |

FIG. 4

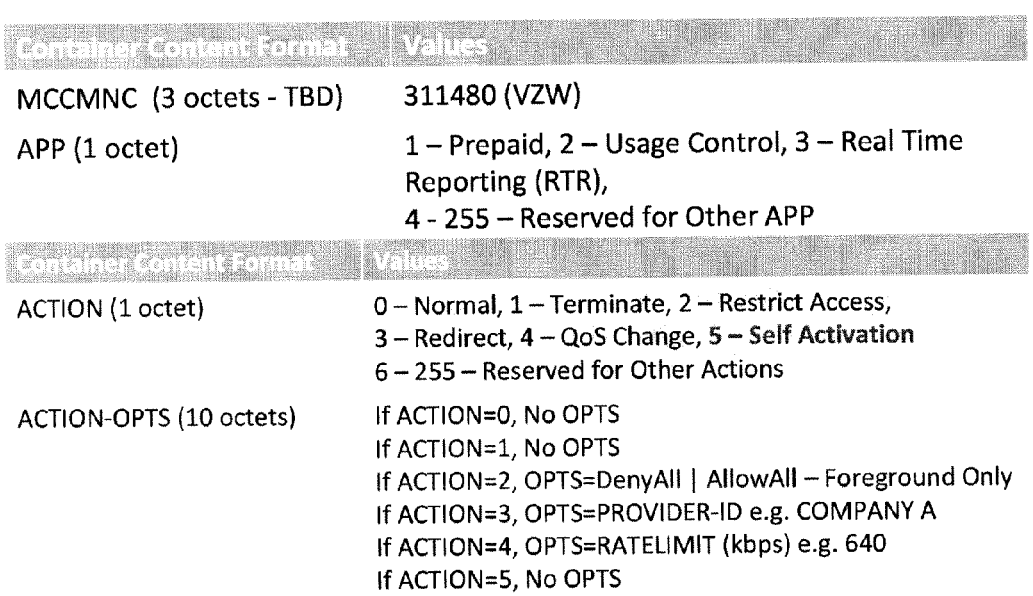

| Container Content Format | Values |
|---|---|
| MCCMNC (3 octets - TBD) | 311480 (VZW) |
| APP (1 octet) | 1 – Prepaid, 2 – Usage Control, 3 – Real Time Reporting (RTR), 4 - 255 – Reserved for Other APP |

| Container Content Format | Values |
|---|---|
| ACTION (1 octet) | 0 – Normal, 1 – Terminate, 2 – Restrict Access, 3 – Redirect, 4 – QoS Change, 5 – Self Activation 6 – 255 – Reserved for Other Actions |
| ACTION-OPTS (10 octets) | If ACTION=0, No OPTS<br>If ACTION=1, No OPTS<br>If ACTION=2, OPTS=DenyAll \| AllowAll – Foreground Only<br>If ACTION=3, OPTS=PROVIDER-ID e.g. COMPANY A<br>If ACTION=4, OPTS=RATELIMIT (kbps) e.g. 640<br>If ACTION=5, No OPTS |

SELF-ACTIVATION THROUGH A NON-ACTIVATED DEVICE

BACKGROUND

In recent years, mobile wireless communications have become increasingly popular. Initial implementations of mobile wireless communications, for example in the form of cellular telephone networks, supported circuit switched voice communication services. Wireless communication devices such as mobile or "cell" phones have expanded greatly in functionality over the last decade. For example, wireless network carriers developed short message service (SMS) technology to provide text and/or e-mail communications via the wireless communication networks. As the public wireless communication networks have evolved to provide greater bandwidth and packet based services, the industry has developed a variety of data services, such as web browsing, as well as a variety of services using multimedia message service (MMS) technology.

At present, customers are typically required to go through various cumbersome activation processes in order to connect a new mobile device to a wireless network. One such process is store activation, where a customer enters a store to activate the subscriber identity module (SIM) card with the device. The SIM typically includes a secure storage that is generally used for storing an international mobile subscriber identity (IMSI) and a network hash key used in identifying and authenticating the mobile station on a particular wireless carrier network. Customers also typically utilize a customer care call for activation. For this process, a customer calls a customer service or care facility for activation of the SIM card with the device. Internet activation is also typically used, where a customer activates the SIM card for the device by navigating a website provided by or for the network provider. Another type of common activation process is a pre-activated SIM card. For this, a customer purchases a pre-activated SIM card with a selected price plan. While providing for activation of the SIM cards used with the wireless devices, such techniques typically involve reliance on customer service representatives, and may not be convenient for the customers.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 3 illustrates exemplary information content for specific fields of a protocol configuration option useful for self-activation of a mobile device.

FIG. 4 illustrates exemplary information content for specific fields of a container content format useful for self-activation of a mobile device.

Figure 1:
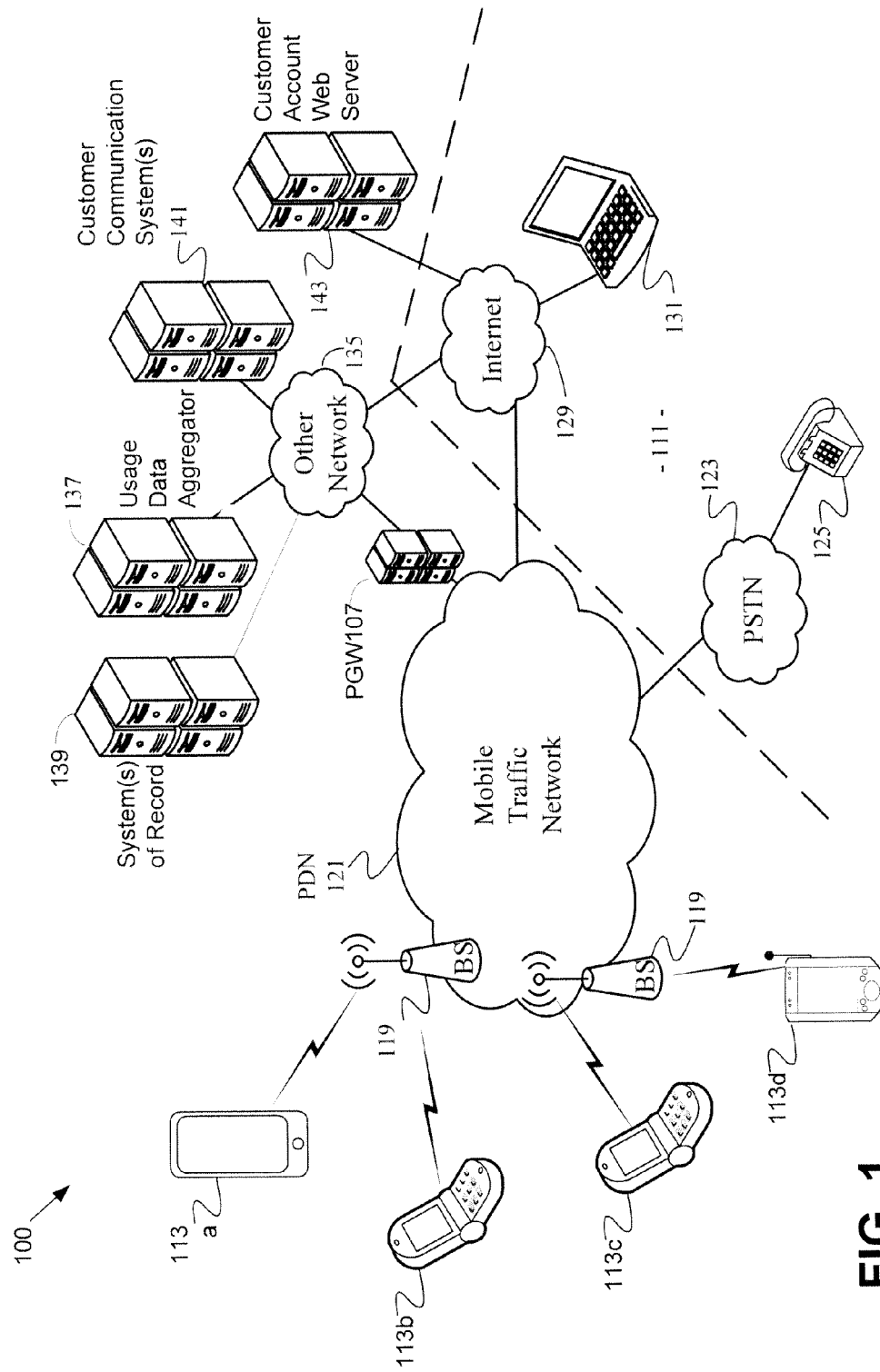
FIG. 1 illustrates a wireless packet data communications network for providing a mobile communications for mobile devices as well as a system providing a framework for self-activation of a mobile device.

While certain embodiments and aspects of the subject technology are depicted in the drawings, one skilled in the art will appreciate that the embodiments and aspects depicted are illustrative and that variations of those shown, as well as other embodiments and aspects described herein, may be envisioned and practiced within the scope of the present disclosure.

DETAILED DESCRIPTION

In the following detailed description, numerous specific details are set forth by way of examples in order to provide a thorough understanding of the relevant teachings. It should, however, be apparent to those skilled in the art that the present teachings may be practiced without such details. In other instances, well-known methods, procedures, components, and/or circuitry have been described at a relatively high-level, without detail, in order to avoid unnecessarily obscuring aspects of the present teachings.

The various examples discussed below enable a user of a mobile device to activate the device for operation by a process of self-activation, without requiring the user to gain separate access to the Internet, such as by a personal computer rather than the mobile device, or the user having to rely on a sales representative for activation of the mobile device. Systems and methods in accordance with the present disclosure provide detection by a wireless network of self-activation capability of a subscriber identity module (SIM) card used with the device preparatory to self-activation of the mobile device by a user, e.g., a customer. For such self-activation, the user can use the mobile device itself to activate the SIM card used with the device through the Internet or through a device client resident on the mobile device.

In one aspect, the mobile device user activates a SIM card used with the device (self-activation) through the Internet or through the device client, without any need for assistance from a customer service representative such as at a store or service center. For example, a user can purchase (e.g., through the Internet or in a store) a mobile device with a non-activated SIM card. The user can insert the SIM card into the mobile device (if it is not already inserted), and then turn the device on. The device client detects that the SIM card is self-activation capable, and then provides a customized interface (e.g., a sequence of user interface screens) to walk the customer/user through the self-activation process. The interface can provide various features such as price plan options and/or other offerings, which may be dependent on the make and model of the mobile device as recognized by the client through accessing the SIM card. The activation interface can include a sequence of user input screens for selecting features associated with activation of the mobile device within the carrier's wireless network. The customer/user can correspondingly select a desired price plan and/or other available features through the interface. As a result, the SIM card of the mobile device can then be activated through the carrier's wireless network, meaning that the customer/user is then able to use the data and phone services provided by the carrier. Accordingly, the customer/user can be provided with self-activation of the mobile device, without any need for assistance from a customer service representative such as at a store or service center.

In one example, an activation method may be initiated on a server in response to receiving a message including an information element field in a bearer channel of a wireless packet data communication network. Self-activation criterion is then determined from an account for the mobile device stored on the server and a comparison of the container content to the self-activation criterion is made. Upon determining, based on the comparison, that the container content has met the self-activation criterion, a message for activation of the mobile device is sent from the server to the mobile device through an information element field within a message in the bearer channel of the wireless packet data communication network. Additional steps may also be provided for such self-activation, as will be described in further detail below.

Reference now is made in detail to the examples illustrated in the accompanying drawings and discussed below. FIG. 1 illustrates a network 100 including a number of mobile devices, which is coupled to other communication networks and several systems/elements associated with or included in the mobile network for various functions as may be involved in providing self-activation for one or more mobile devices. Network 100 may be operated by a carrier or service provider to provide a wide range of mobile communication services and ancillary services or features to its subscriber customers and associated mobile device users. The elements indicated by the reference numeral 100 generally are elements of the network and are operated by or on behalf of the carrier, although the mobile devices typically are sold to the carrier's customers. The mobile communication network 100 provides communications between mobile devices as well as communications for the mobile devices with networks and stations 111 outside the mobile communication network 100.

For purposes of later discussion, several mobile devices (in general, referred to as 113) appear in the drawing, to represent examples of the mobile devices that may receive various services via the mobile communication network 100. Today, mobile devices typically take the form portable handsets, smart-phones, tablet computers or personal digital assistants (PDAs), although they may be implemented in other form factors, including consumer and business electronic devices. The mobile devices 113a, 113b, 113c, and 113d, for example, may take the form of a mobile telephone station, enhanced with display and user input capabilities to support certain text and image communications, such as email, picture communication and web browsing applications. In another example (e.g., as illustrated by 113e in FIG. 2), a mobile device is a portable computing device, specifically, comprising a wireless modem card inserted into a handheld or laptop personal computer (PC) or the like. Alternatively, the PC may connect to a handset device 113f, similar to the handset type mobile device 113a. The mobile device 113a includes a wireless transceiver compatible with the particular type of packet data service offered by the network 100.

Continuing with the description of FIG. 1, the network 100 allows users of the mobile devices to initiate and receive telephone calls to each other as well as through the public switched telephone network (PSTN) and telephone stations connected thereto. The network 100 allows SMS type text messaging between mobile devices and similar messaging with other devices via Short Message Service Centers (SMSCs). The network 100 can also offer a variety of other data services via the Internet, such as downloads, web browsing, e-mail, etc. The mobile communication network 100 typically is implemented by a number of interconnected networks. Hence, the overall network 100 may include a number of radio access networks (RANs), as well as regional ground networks interconnecting a number of Radio Access Networks (RANs) and a wide area network (WAN) interconnecting the regional ground networks to core network elements, such as the Multimedia Messaging Service Centers (MMSCs). A regional portion of the network 100, such as that serving mobile devices 113a to 113f will typically include one or more RANs and a regional circuit and/or packet switched network and associated signaling network facilities.

Physical elements of a RAN, operated by one of the mobile service providers or carriers, include a number of base stations represented in the example by the base stations (BSs) 119. Such base stations 119 typically comprise a base transceiver system (BTS) which communicates via an antennae system at the site of base station and over the airlink with one or more of the mobile devices 113a to 113f when the mobile devices are within range. Each base station 119 typically includes a BTS coupled to several antennae mounted on a radio tower within a coverage area often referred to as a "cell." The BTS is the part of the radio network that sends and receives RF signals to/from the mobile devices that the base station currently serves.

The radio access networks also include a traffic network represented generally by the cloud at 121, which carries the user communications for the mobile devices 113a to 113f between the respective base stations 119 and other elements with or through which the mobile devices 113a to 113f communicate. Individual elements such as switches and/or routers forming the traffic network 121 are omitted here form simplicity. The traffic network portion 121 of the mobile communication network 100 connects to a public switched telephone network (PSTN) 123. This allows the network 100 to provide voice grade call connections between mobile devices and regular telephones connected to the PSTN 123. The drawing in FIG. 1 illustrates one such telephone at 125. The PSTN 123 also provides connections to other types of customer premises equipment, such as facsimile or 'FAX' machines (not shown).

The carrier also operates a number of systems that provide ancillary functions in support of the communications services provided through the network 100, and those elements communicate with other nodes/elements of the network 100 via one or more private IP type packet data networks 135 (sometimes referred to as an Intranet). The support elements, for example, include one or more systems of record, such as the system shown at 139. For example such a system 139 may include subscriber account records. A large carrier typically has a number of such systems, and the system that stores the account data for a particular subscriber may be referred to as the "system of record" for that subscriber's account.

The traffic network portion 121 of the mobile communication network 100 connects to a public packet switched data communication network, such as the network commonly referred to as the "Internet" shown at 129. Packet switched communications via the traffic network 121 and the Internet 129 may support a variety of user services through the network 100, such as mobile device communications and multimedia messages, e-mail, web surfing or browsing, programming and media downloading (including audio and video), etc. For example, the mobile devices may be able to receive messages from and send messages to user terminal devices, such as personal computers, either directly (peer-to-peer) or via various servers (not separately shown). The drawing shows one such user terminal device as a personal computer (PC) 131 by way of example. Of note for purposes of this discussion, many of the network messages used for self-activation, as discussed herein, may be sent to various mobile devices using the packet data network (PDN) 121. The Evolved Packet Core (EPC) of network 121 uses the concept of Evolved Packet System (EPS) bearer channels to route IP traffic from a gateway 107 in the network 121 to the mobile device (e.g. 113a to 113f). A bearer channel is an IP packet flow with a defined quality of service (QoS) between the Packet Data Network (PDN) Gateway (PGW) 107 and the mobile device (e.g., 113a to 113f). It is within these packets that messages for self-activation to a mobile device (113a to 113f) are sent.

In one example, a self-activation message is embedded in the protocol configuration option (PCO) in the message provided to the device 113 through the bearer control plane.

Figure 2:
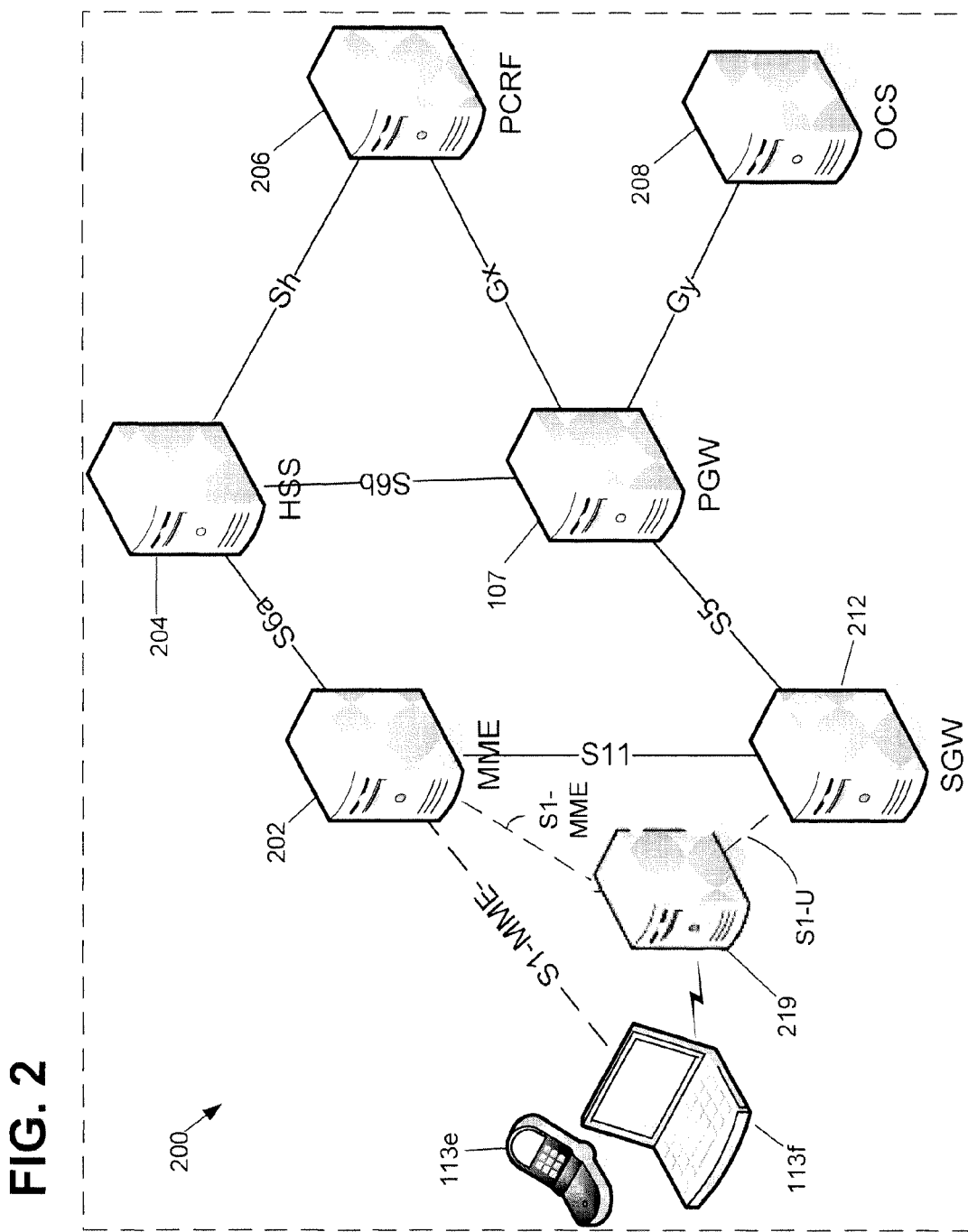
FIG. 2 illustrates a high level interface block diagram depicting an exemplary system which provides self-activation to a mobile device.

FIG. 2 illustrates a high level interface block diagram depicting an exemplary system 200 which provides for self-activation of a mobile device. The system 200 shown can include a System Architecture Evolution (SAE) with the core network architecture according to the Third Generation Partnership Project's (3GPP's) Long Term Evaluation (LTE) wireless communication standard. The SAE 200 has a flat, all-IP architecture with separation of control plane and user plane traffic. The SAE 200 system includes eNodeB (eNB) 219 and servers including Mobility Management Entity (MME) 202, Home Subscriber Server (HSS) 204, and the Policy Control and Charging Rules Function (PCRF) 206, which may be part of the network 135 of FIG. 1. As will be described in a later section, eNB 219 is an enhanced base station that acts as an interface between the mobile device and the mobile network. MME 202 is a control-node for the communication access network. For example, it is used for idle mode mobile device tracking and paging procedure including retransmissions. It also provides bearer channel activation/deactivation process and selection of the serving gateway (SGW) 212 for the mobile device (e.g., 113e). MME 202 also provides authentication of the user by interacting with the Home Subscriber Server (HSS) 204. The MME 202 also terminates the S6a interface towards the HSS 204 for roaming mobile devices 13e and 13f.

The Home Subscriber Server (HSS) 204 shown in FIG. 2 is a central database that contains user-related and subscription-related information. The HSS 204 provides features such as mobility management, call and session establishment support, user authentication and access authorization. For example, the HSS 204 stores the Mobile Station International Subscriber Directory Number (MSISDN), the SIM-card identification information, and the like.

The Packet Data Network (PDN) Gateway (PGW) 107 provides connectivity from the mobile devices 113e and 113f to external packet data networks. It is a point of exit and entry of traffic for the mobile devices 113e and 113f of FIG. 2. The PGW server 107 monitors how much data is used by a mobile device (e.g., 113e and/or 113f) at any given time.

The Policy Control and Charging Rules Function (PCRF) 206 provides for policy control decision-making, as well as for controlling the flow-based charging functionalities in the Policy Control Enforcement Function (PCEF), which resides in the PGW 107. The PCRF 206 provides the QoS authorization that decides how certain data flow is treated in the PCRF 206 and ensures that the data flow is in accordance with the user's subscription profile.

The Online Charging System (OCS) server 208 provides real time credit control and charging for communication services. For example, it provides an account balance management function, credit control information, and allows a communications service provider to charge their customers, in real time, based on service usage. The OCS server 208, instructs the PGW server 107 how much data the user is allowed to use (e.g., data quota). The OCS 208 may also determine whether a predetermined account criterion has been met.

The Serving Gateway (SGW) 212 routes and forwards data packets to the mobile devices 113e and 113f through the MME 202. For example, a data packet can include a message that a SIM card is enabled for self-activation. The SGW 212 manages and stores mobile device parameters of the IP bearer channel service, including network internal routing information.

As was described above, a self-activation message can be embedded in the protocol configuration option (PCO) in a message to the device 113 through the bearer control plane. As illustrated in FIG. 3, the PCO is an information element field within the standard (existing type of) message using a standard protocol from the network 121 to the device (e.g., 113a to 113f). Thus, the PCO may be used to provide information useful for self-activation, as will be explained in further detail below.

For example, the PCO, in one embodiment, is a type 4 information element with a minimum length of 3 octets and a maximum length of 253 octets (see, e.g., 3GPP TS 24.008 V10.3.0). For example, the PCO may include the following information to a mobile device (e.g., 13a to 13f):
  0001H (P-CSCF IPv6 Address);
  0002H (IM CN Subsystem Signaling Flag);
  0003H (DNS Server IPv6 Address);
  0004H (Policy Control rejection code);
  0005H (Selected Bearer Control Mode);
  0006H (Reserved);
  0007H (DSMIPv6 Home Agent Address);
  0008H (DSMIPv6 Home Network Prefix);
  0009H (DSMIPv6 IPv4 Home Agent Address);
  000AH (Reserved);
  000BH (Reserved);
  000CH (P-CSCF IPv4 Address);
  000DH (DNS Server IPv4 Address);
  000EH (MSISDN);
  000FH (IFOM-Support);
  0010H (IPv4 Link MTU); and
  FF00H to FFFFH reserved for operator specific use, e.g., self-activation.

In one example, where a predetermined criterion is met, the container identifier inside the PCO is set to one of the reserved fields, e.g., FF00H, to provide self-activation information from/to the mobile device in the create session response message in the LTE network or Proxy Mobile Internet Protocol (PMIP) Proxy Binding Acknowledgement (PBA) message in Evolved High Rate Packet Data (eHRPD). In exemplary embodiments, the FF00H field may be utilized, for the sake of simplicity, as it is the first available field reserved for operator specific use. Further, the container identifier field, e.g., FF00H, can be used to provide instructions to the mobile device 113 and/or network 100 for self-activation of the mobile device 113.

FIG. 3 illustrates a table 300 showing exemplary information container content for field FF00H tailored for each specific mobile device (e.g., 113a to 113f). As shown, the container content can include a field designating the carrier (e.g., MCCMNC for Verizon), an application field (e.g., APP), an action field (e.g., ACTION), and an action options field (e.g., ACTION-OPTS). These fields will be described in more detail with relation to the example in FIG. 4, below.

FIG. 4 illustrates a table 400 showing a PCO container indicating self-activation for a given SIM used with a particular mobile device. As shown, by specifying an action having a designated value in the ACTION field (e.g., ACTION=5) of a specified reserved PCO container (e.g., FF00H), a device client can ascertain that the SIM card used with the device is enabled for self-activation. For example, for a PCO message a container designated as FF00H can include four fields, as shown in FIG. 4, i.e., a MCCMNC field, an APP field, an ACTION field, and an optional ACTION-OPTS field. Of course, while certain fields shown in FIG. 4 are illustrated with no options required, e.g., ACTION=5, such is not a restriction and options may be implemented. For example, for self-activation, options may be utilized to provide additional information to the device client about the OEM ID, IMEIS/MEID, MSISDN, allowed price plans, and the like. Using such functionality, one or more servers in a wireless network (as described in more detail below) can detect that a SIM of a mobile device is configured for self-activation, and send a corresponding indication to the mobile device. In response to receiving the indication sent by the network, the mobile device can present designated display screens to the user to provide a self-activation process with the user's input.

Figure 5:
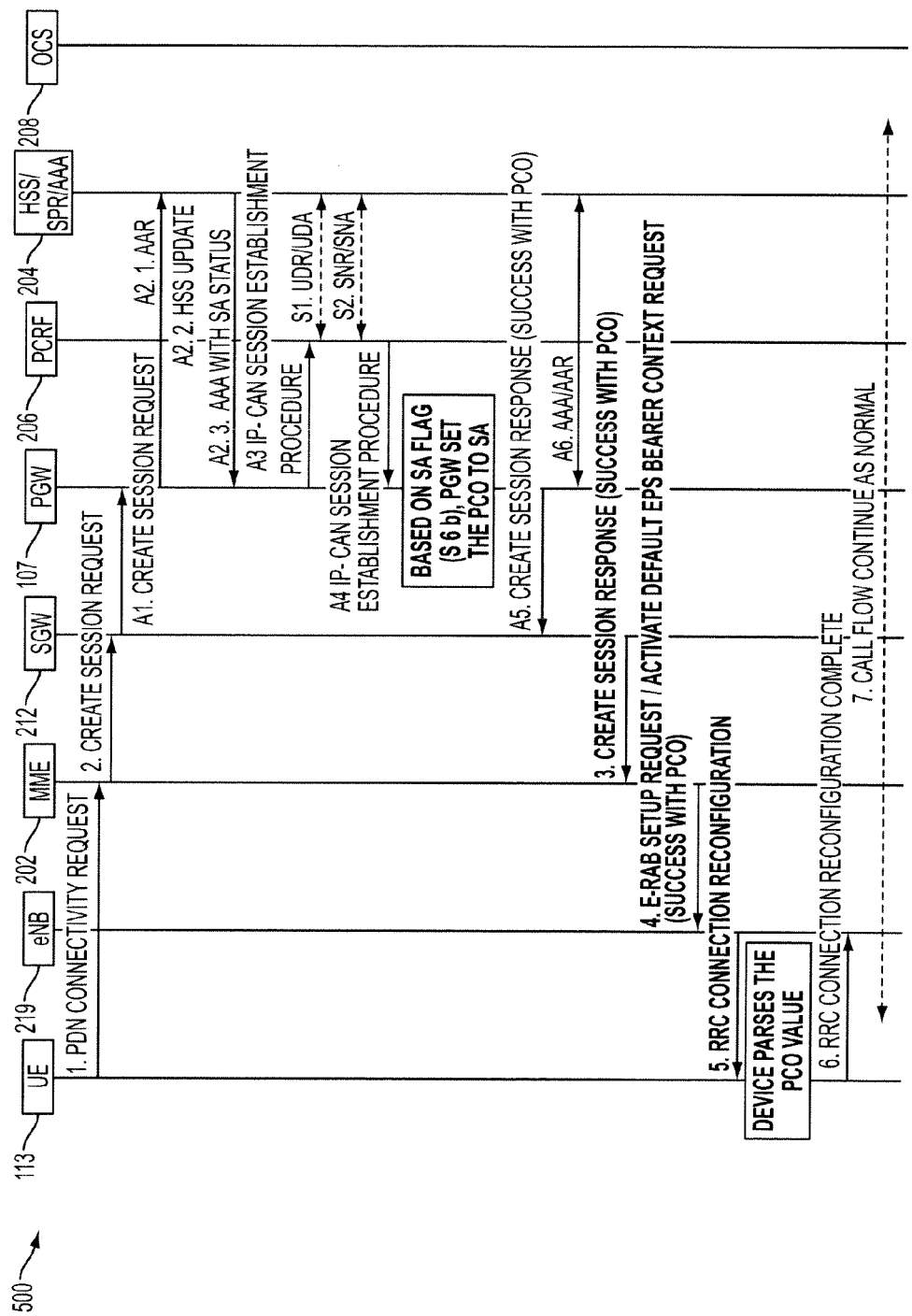
FIG. 5 illustrates an exemplary call flow of a 3GPP Long Term Evolution (LTE) session in which a device client resident on a mobile device detects the self-activation capability of the device SIM preparatory to a self-activation process in which a user is led through an activation process using the device.

With the foregoing overview of the system, it may be helpful now to consider a high-level discussion of an example of detection of self-activation enablement for a SIM used with a given mobile device for self-activation of the mobile device used with a carrier network. FIG. 5 illustrates an exemplary call flow 500 of a 3GPP Long Term Evolution (LTE) session in which a device client resident on a mobile device detects the self-activation capability of the device SIM preparatory to a self-activation process in which a user is led through an activation process using the device.

As part of the detection of self-activation capability process for a given SIM used with a given mobile device, a user can activate the mobile device having the SIM card inserted therein; prior to such activation, the device does not have access to the provider's wireless network, while after such activation the device does have access to the network. In step 1, the mobile device (user equipment—UE) 113 initiates a new PDN connection for activation by sending a PDN Connectivity Request to the MME 202.

In step 2, the MME 202 sends a Create Session Request to the SGW 212 to create a data session. The Create Session Request is used to establish connectivity for the mobile device with the service provider's network.

In step A1, the SGW 212 forwards the Create Session Request to the PGW 107 to create the data session.

In step A2.1, the PGW 107 sends an Authentication Authorization Request (AAR) to 3GPP Authentication, Authorization, and Accounting (AAA) 204 to authorize the Internet Access Point Name (APN) for the subscriber. For example, AAA 204 provides authentication of the SIM used for the mobile device and determines what network services the SIM is authorized to use, e.g., self-activation or other prepaid services. Further, it accumulates accounting records that may be used for billing purposes. Although AAA 204 may perform the functions of the AAA, Subscription Profile Repository (SPR), and HSS, it may in other embodiments physically be a separate server from the SPR and/or HSS.

In step A2.2, the 3GPP AAA 204 attempts to retrieve the profile for the mobile device (via the SIM) from the HSS 204. In the case of a SIM card that is self-activation enabled, the profile may reflect that feature.

In step A2.3, the 3GPP AAA 204 sends the retrieved subscriber profile from the HSS 204 for the SIM of the particular mobile device to the PGW 107 indicating self activation is desired.

In step A3, the PGW 107 operates with the PCRF 206 to establish an IP-CAN session. For the process, the PGW 107, e.g., sends a Credit Control Request (CCR) to the PCRF 206 to request policy information in connection with the mobile device. If the PCRF 206 does not have the subscriber's subscription-related information, in step S1, the PCRF 206 sends a User Data Request (UDR) to the Subscription Profile Repository (SPR) to retrieve subscriber data and the SPR returns with UDA data containing subscriber data. In the example shown, the SPR is part of the HSS 204 (although as above, it may be a separate server).

In step A4, the IP-CAN establishment procedure continues, e.g., the PCRF 206 sends back the policy and the QoS information to the PGW 107.

In step A5, the PGW 107 returns to the SGW 212 a Create Session Response with the new PCO information (with the ACTION field set to the value designation for Self Activation, e.g., 5, as shown in FIG. 4). The PGW 107 determines that the Create Session Response is to be sent based on the information obtained in the activation request indicating the subscriber desires self-activation.

In step A6, the PGW 107 sends an Authentication Authorization Request (AAR) to the 3GPP AAA and receives an AAA response.

In step 3, the SGW 212 provides the Create Session Response to the MME 202 with the PCO information.

In step 4, the MME 202 sends Evolved Packet System Radio Access Bearer (E RAB) request (e.g., Activate Default EPS Bearer Context Request) to the eNB (e.g., base station 119 from FIG. 1 or as shown in FIG. 2) which includes the PCO information. The eNB is an enhanced base station that acts as an interface between the mobile device and the mobile network. Node B is a term used in LTE to describe the components equivalent to the base transceiver system (BTS) in some mobile networks. Traditionally, a BTS is controlled by a Radio Network Controller (RNC). However, in later iterations of LTE, the NodeBs are enhanced with control functionality to effectively replace or eliminate the separate RNC. At least in some examples, NodeB is the equivalent of base station or BTS; and the term eNodeB or eNB stands for "evolved NodeB."

In step 5, the eNB sends a Radio Resource Control (RRC) connection re-configuration request to the mobile device (UE). The mobile device parses the PCO information to retrieve subscriber status and act accordingly based on the subscriber status. For example, based on the action code obtained and the mobile device client, the mobile device can now instruct the user how to progress through the self-activation process.

In step 6, the mobile device (UE) returns the RRC Connection Configuration Complete to the eNB, thereby acknowledging that the instructions have been successfully received.

In step 7, the call flow continues with a normal setup process, e.g., the uplink (UL) and downlink (DL) data path will be setup between UE and the network. After the setup is complete, the UE and network will be able to communicate voice and/or data normally able to be communicated after the UE and network are connected.

The foregoing teachings are also compatible with Evolved High Rate Packet Data (eHRPD), which is a method that allows the mobile operator to upgrade their existing HRPD packet core network using elements of the SAE/EPC architecture. For example, eHRPD is an evolutionary path to LTE which provides seamless service mobility between the eHRPD and LTE networks. For example, eHRPD has the ability to provide seamless service mobility between High Rate Packet Data (HRPD) and LTE access networks with a single mobility management protocol. The operator can leverage the benefit of optimized handover (e.g., no dropped sessions and reduced handover latency) between LTE and eHRPD.

Figure 6:
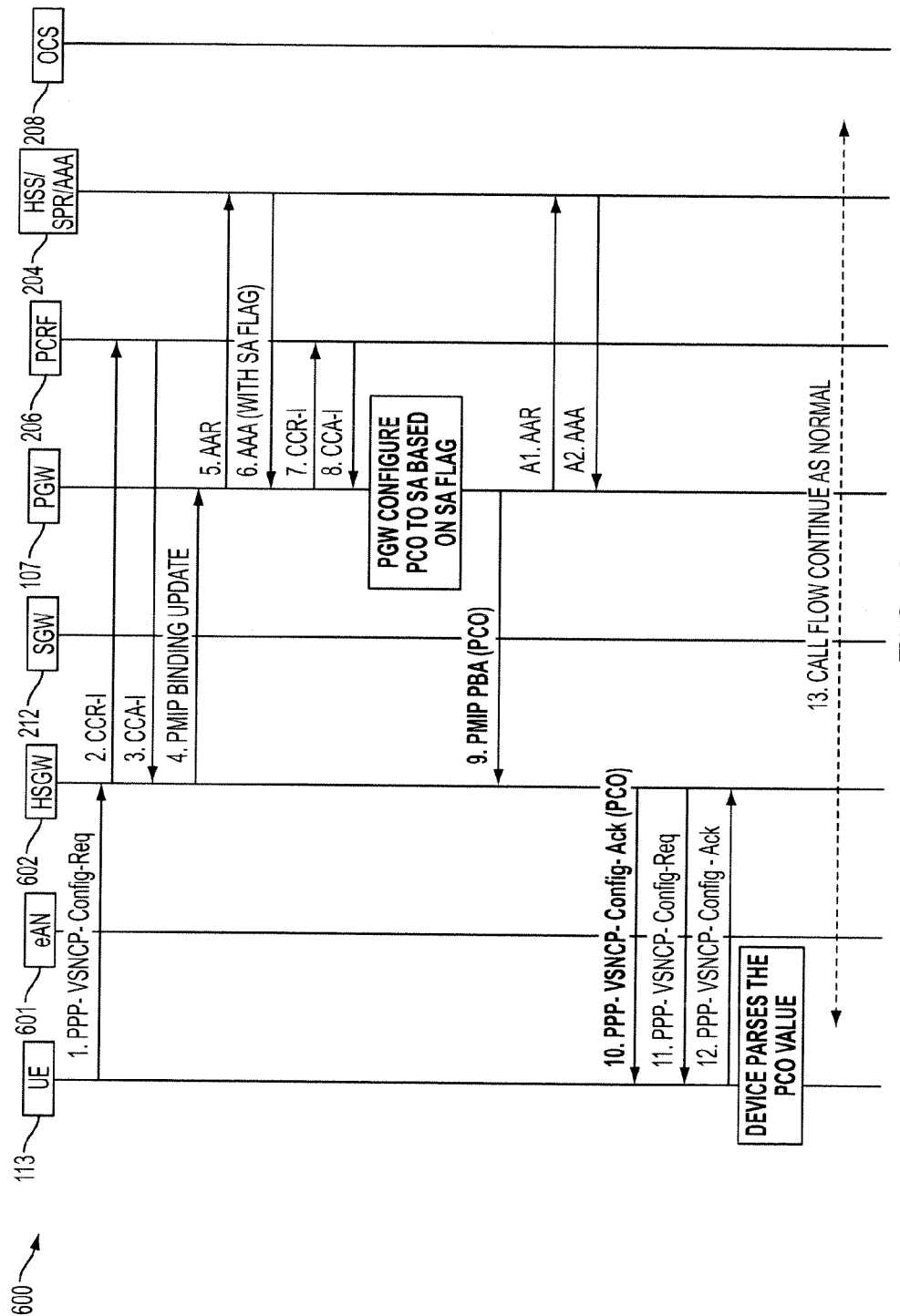
FIG. 6 illustrates an exemplary call flow of an eHRPD session in which a device client resident on a mobile device detects the self-activation capability of the device SIM preparatory to a self-activation process in which a user is led through an activation process using the device.

FIG. 6 illustrates an exemplary call flow 600 of an eHRPD session in which a device client resident on a mobile device detects the self-activation capability of the device SIM preparatory to a self-activation process in which a user is led through an activation process using the device. In FIG. 6, a High Rate Packet Data Serving Gateway (HSGW) replaces the MME 202 of FIGS. 1 to 5.

In step 1, the user of the mobile device (UE) 113 initiates a Point to Point Protocol, Vendor-Specific Network Control Protocol Configuration (PPP-VSNCP-Config) request to the High Rate Packet Data Serving Gateway (HSGW) 602 to start a new data session between the mobile device 113 and the network.

In step 2, the HSGW 602 sends a Credit Control Request Initial (CCR-I) to the PCRF 206.

In step 3, the PCRF 206 returns a Credit Control Answer Initial to the HSGW.

In step 4, the HSGW 602 sends a Proxy Mobile IPv6 (e.g., PMIPv6 or PMIP) Binding Update to the PGW 107. A PMIP is a standardized network protocol for building a common access technology independent of mobile core networks accommodating various access technologies, including 3GPP, 3GPP2, and WLAN based access architectures.

In step 5, the PGW 107 sends an Authentication Authorization Request (AAR) to Authentication, Authorization, and Accounting (AAA) 204 to authorize the Internet APN for the subscriber. For example, AAA 204 provides authentication of the SIM used for the mobile device and determines what network services the SIM is authorized to use, e.g., self-activation or other prepaid services.

In step 6, the 3GPP AAA attempts to retrieve any available profile (via the SIM) and sends the retrieved profile information from the HSS 204 for the particular mobile device to the PGW 107, with an indication that the mobile device is configured for self-activation (meaning that the SIM is enabled for self-activation and the user of the mobile device is a self-activation customer).

In step 7, the PGW 107 sends a Credit Control Request Initial (CCR-I) request to the PCRF 206 to request policy information in connection with the mobile device.

In step 8, the PCRF 206 sends back a Credit Control Answer Initial (CCA-I) and the policy for self-activation to the PGW 107.

In step 9, the PGW 107 processes the self-activation (SA) flag. These policy rules indicate that an account criterion is met (e.g., the SIM card of the mobile device is configured for self-activation). In this regard the Proxy Mobile IPv6 (PMIPv6 or PMIP) is returned to the HSGW 602 with the new PCO information. For example, the PCO information can include a field that designate self-activation for the SIM (e.g., with the ACTION field set to the value designation for Self Activation, e.g., 5, as shown in FIG. 4).

In step A1, the PGW 107 sends an Authentication Authorization Request (AAR) to the 3GPP Authentication, Authorization, and Accounting (AAA) 204 to authorize the Internet APN for the subscriber.

In step A2, the AAA 204 responds with an AAA response to the PGW 107.

In step 10, the HSGW sends a Point to Point Protocol, Vendor-Specific Network Control Protocol Configuration Acknowledgment (PPP-VSNCP-Config-Ack) within the PCO information to the mobile device.

In step 11, the HSGW sends a PPP-VSNCP-Config Request to the mobile device (UE).

In step 12, the mobile device (UE) responds to the HSGW with a PPP-VSNCP-Config-Ack. The mobile device parses the PCO information to retrieve subscriber status and follows instructions therein. Such instructions can include presenting specified display screens to the user for collection of information as part of the self-activation process for the device used with the SIM.

In step 13, the session continues as normal, providing communication between the mobile device and the network, e.g., the uplink (UL) and downlink (DL) data path will be setup between UE and the network. After the setup is complete, the UE and network will be able to communicate voice and/or data normally able to be communicated after the UE and network are connected.

As shown by the above discussion, functions relating to providing self-activation for a mobile device may be implemented on or facilitated by computers or servers connected for data communication via the components of a packet data network, operating as the OCS 208 and/or as a Customer Communication System, e.g., as indicated by 141 shown in FIG. 1. Although special purpose devices may be used, such devices also may be implemented using one or more hardware platforms intended to represent a general class of data processing device commonly used to run "server" programming so as to implement the network status information functions discussed above, albeit with an appropriate network connection for data communication.

A general purpose computer configured as a server, for example, includes a data communication interface for packet data communication. The server computer also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load. In this case, such a platform would run server programming, for example, to provide self-activation to the mobile device so as to function as one of the servers shown in FIGS. 1-2.

A user terminal such as a general-purpose personal computer or a mobile device typically comprises a central processor or other processing device, an internal communication bus, various types of memory or storage media (RAM, ROM, EEPROM, cache memory, disk or flash drives for mass storage, etc.) for code and data storage, and one or more network or communication interfaces or ports for communication purposes. The software functionalities involve programming, including executable code as well as associated stored data, e.g. files used for applications on the mobile device to process the instructions received from the network. The software code is executable by the mobile device. In operation, the code is stored within the mobile device. At other times, however, the software may be stored at other locations and/or transported for loading into the appropriate mobile device system. Execution of such code by a processor of the mobile device enables the mobile device to perform functions of receiving network instructions for self-activation, in essentially the manner performed in the implementations discussed and illustrated herein.

Hence, aspects of the methods, systems, and network architecture facilitating self-activation of a mobile device as outlined above may be embodied in programming. Program aspects of the technology may be thought of as "products" or "articles of manufacture" typically in the form of executable code and/or associated data that is carried on or embodied in a type of non-transitory machine readable medium.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

APPENDIX

Acronym List

The description above has used a large number of acronyms to refer to various services, self-activation messages, and system components. Although generally known, use of several of these acronyms is not strictly standardized in the art. For the convenience of the reader, the following list correlates terms to acronyms, as used by way of example in the detailed description above.

3GPP2—3'rd Generation Partnership Project 2
AAA—Authentication, Authorization, and Accounting
AAR—Authentication Authorization Request
AH—Account Holder
BS—Base Station
BTS—Base Transceiver System
CCA—Credit Control Answer
CCA-I—Credit Control Answer Initial
CCR—Credit Control Request
CCR-I—Credit Control Request Initial
CCRU—Credit Control Request Update
CPU—Central Processing Unit
eAN—Evolved Access Network
EHRPD—Evolved High Rate Packet Data
EPC—Evolved Packet Core
EPS—Evolved Packet System
EPROM—Erasable Programmable Read Only Memory
EEPROM—Electrically Erasable Programmable Read Only Memory
eNB—Evolved Node B
E RAB—Evolved Packet System Radio Access Bearer
FLASH-EPROM—Flash Erasable Programmable Read Only Memory
FUI—Final Unit Indication
HRPD High Rate Packet Data
HSGW—High Rate Packet Data Serving Gateway
HSS—Home Subscriber Server
ID—Identification
LTE—Long Term Evaluation
MD—Mobile Device
MME—Mobility Management Entity
MMSC—Multimedia Messaging Service Center
MSISDN—Mobile Station International Subscriber Directory Number
NAS—Non Access Stratum
OCS—Online Charging System
PCEF—Policy Control Enforcement Function
PCO—Protocol Configuration Option
PCRF—Policy and Charging Rules Function
PDN—Packet Data Network
PGW—Packet Data Network Gateway
PMIP—Proxy Mobile IPv6
PPP-VSNCP—Vendor-Specific Network Control Protocol Configuration
PROM—Programmable Read Only Memory
PSTN—Public Switched Telephone Network
QCI—Quality of Service Class Identifier
QoS—Quality of Service
RAM—Random Access Memory
RAN—Radio Access Network
RAR—Re-Authorization Request
ROM—Read Only Memory
RRC—Radio Resource Control
SAE—System Architecture Evolution
SGW—Serving Gateway
SIM—Subscriber Identity Module SPR—Subscription Profile Repository
UL—Up Link
UDR—User Data Request
WAN—Wide Area Network

What is claimed is:

1. A method, comprising steps of:
receiving, from a mobile device, on at least one server configured to provide connectivity for the mobile device to a wireless packet data communication network, a message, including a container having an information element field, in a bearer channel of the wireless packet data communication network;
comparing the container content of the received message to a self-activation criterion; and
upon determining, based on the comparison, that the container content has met the self-activation criterion:
determining whether the self-activation is authorized without requesting further information from the mobile device, and
responsive to the self-activation being authorized, sending a self-activation message for self-activation of the mobile device from the at least one server to the mobile device through a further information element field in a further container within a further message in the bearer channel of the wireless packet data communication network.

2. The method of claim 1, wherein the message includes a protocol configuration option (PCO) and the information element field is a container identifier.

3. The method of claim 2, wherein the container identifier is designated as FF00H in the PCO.

4. The method of claim 1, further comprising providing a user interface to the mobile device for facilitating user setup of the mobile device, in response to the self-activation message, the user interface including instructions that further configure the mobile device to allow user-initiated network access requests.

5. The method of claim 1, further comprising providing a user interface to the mobile device for facilitating user setup of the mobile device, in response to the self-activation message, the user interface including instructions that further configure the mobile device to allow user-initiated subscription to price plan options.

6. The method of claim 1, further comprising providing a user interface to the mobile device for facilitating user setup of the mobile device, in response to the self-activation message, wherein the user interface comprises a sequence of user input screens for selecting features associated with activation of the mobile device.

7. The method of claim 1, further comprising providing a user interface to the mobile device for facilitating user setup of the mobile device, in response to the self-activation message, wherein the user interface comprises a user input screen with one or more options for configuration of the mobile device.

8. The method of claim 1, further comprising causing a packet data network gateway (PGW) of the network, in response to the self-activation message, to return a create session response to a servicing gateway (SGW) of the network for self-activation of the mobile device.

9. The method of claim 1, wherein the determining whether the self-activation is authorized includes sending an authentication authorization request to an authentication, authorization and accounting (AAA) function and receiving a response from the AAA function indicating that the self-activation is authorized.

10. The method of claim 1, wherein the determining whether the self-activation is authorized includes sending a credit control request (CCR) and receiving a credit control answer (CCA).

11. The method of claim 1, wherein the self-activation message is embedded in a protocol configuration option (PCO) and includes an Internet Protocol version 6 (IPv6) address.

12. A computer system configured as at least one server, the computer system comprising:
a processor;
a network interface coupled to the processor configured to enable communications via a communication network;
a storage device for content and programming; and
a program stored in the storage device, wherein execution of the program by the processor configures the computer system to perform functions, including functions to:
receive, on at least one server, a message, including a container having an information element field, in a bearer channel of a wireless packet data communication network;
determine a self-activation criterion;
perform a comparison, on the at least one server, of the container content to the self-activation criterion; and
upon determining, based on the comparison, that the container content has met the self-activation criterion:
determining whether the self-activation is authorized without requesting further information from the mobile device, and
responsive to the self-activation being authorized, sending a self-activation message for self-activation of the mobile device from the at least one server to the mobile device through a further information element field in a further container within further a message in the bearer channel of the wireless packet data communication network.

13. The system of claim 12, wherein message includes a protocol configuration option (PCO) and the information element field is a PCO container identifier.

14. The system of claim 13, wherein the container identifier is designated as FF00H in the PCO.

15. The system of claim 12, wherein execution of the program by the processor further configures the computer system to perform functions to provide a user interface to the mobile device for facilitating user setup of the mobile device, in response to the self-activation message, wherein the user interface further configures the mobile device to allow user-initiated network access requests.

16. The system of claim 12, wherein execution of the program by the processor further configures the computer system to perform functions to provide a user interface to the mobile device for facilitating user setup of the mobile device, in response to the self-activation message, wherein the instructions user interface further configure the mobile device to allow user-initiated subscription to price plan options.

17. The system of claim 12, wherein execution of the program by the processor further configures the computer system to perform functions to provide a user interface to the mobile device for facilitating user setup of the mobile device, in response to the self-activation message, wherein the user interface comprises a sequence of user input screens for selecting features associated with activation of the mobile device.

18. The system of claim 12, wherein execution of the program by the processor further configures the computer system to perform functions to provide a user interface to the mobile device for facilitating user setup of the mobile device, in response to the self-activation message, wherein the user interface comprises a user input screen with one or more options for configuration of the mobile device.

19. The system of claim 12, wherein the determining whether the self-activation is authorized includes sending an authentication authorization request to an authentication, authorization and accounting function and receiving a response from the AAA function indicating that the self-activation is authorized.

20. The system of claim 12, wherein the determining whether the self-activation is authorized includes sending a credit control request (CCR) to a policy and charging rules function (PCRF) and receiving a response from the PCRF indicating that the self-activation is authorized.

\* \* \* \* \*